United States Patent
Das et al.

(10) Patent No.: US 10,122,893 B2
(45) Date of Patent: Nov. 6, 2018

(54) AUTOMATIC POST PROCESSING OF SPOT COLOR COMBINATIONS FOR A CONSTRAINED COLORANT SET

(71) Applicant: Xerox Corporation, Norwalk, CT (US)

(72) Inventors: Arindam Das, Konnagar (IN); Ranita Bej, Kolkata (IN); Guo-Yau Lin, The Woodlands, TX (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/459,611

(22) Filed: Mar. 15, 2017

(65) Prior Publication Data

US 2018/0270396 A1    Sep. 20, 2018

(51) Int. Cl.
  *H04N 1/60*    (2006.01)
  *G06K 15/02*   (2006.01)
  *G06F 3/12*    (2006.01)

(52) U.S. Cl.
  CPC ......... *H04N 1/6008* (2013.01); *G06F 3/1298* (2013.01); *G06K 15/02* (2013.01); *H04N 1/6038* (2013.01); *H04N 2201/0094* (2013.01)

(58) Field of Classification Search
  CPC .. H04N 1/6008; H04N 1/6058; H04N 1/6061; H04N 1/54
  See application file for complete search history.

(56) References Cited

U.S. PATENT DOCUMENTS

| | | | |
|---|---|---|---|
| 5,596,355 A | 1/1997 | Koyama et al. | |
| 5,745,120 A | 4/1998 | De Baer et al. | |
| 6,744,531 B1 | 6/2004 | Mestha et al. | |
| 7,738,140 B2 | 6/2010 | Hancock et al. | |
| 7,872,785 B2 | 1/2011 | Lin et al. | |
| 7,990,592 B2 | 8/2011 | Mestha et al. | |
| 8,233,191 B2 | 7/2012 | Tsuchiya | |
| 8,351,100 B2 | 1/2013 | Mestha et al. | |
| 8,379,048 B2 | 2/2013 | Samworth | |
| 8,736,930 B2 | 5/2014 | Robinson et al. | |
| 2005/0008223 A1* | 1/2005 | Zeng | H04N 1/6058 382/162 |

(Continued)

OTHER PUBLICATIONS

Kiran Deshpande, "N-colour separation methods for accurate reproduction of spot colours", A thesis submitted in partial fulfilment of the requirements of the University of the Arts London for the degree of PhD, May 2015, pp. 1-275.

*Primary Examiner* — King Poon
*Assistant Examiner* — Michael Burleson
(74) *Attorney, Agent, or Firm* — Gibb & Riley, LLC

(57) ABSTRACT

According to exemplary methods, a processor of a printing device determines color values out of a first colorant combination using marking materials for standard colorants and marking materials for one or more extended gamut colors. The extended gamut color has colorants other than the standard colorants. Responsive to the first colorant combination including color values for each of a pair of two complementary colors, the processor calculates a second colorant combination that produces the same human-perceivable color as the first colorant combination. The second colorant combination includes only one color of the pair of two complementary colors. The printing device produces output using the second colorant combination for the standard colorants and the extended gamut color.

18 Claims, 9 Drawing Sheets

(56) References Cited

U.S. PATENT DOCUMENTS

2005/0150411 A1\* 7/2005 Bestmann ............... H04N 1/54
   101/484
2007/0041028 A1\* 2/2007 Seko .................... H04N 1/6058
   358/1.9
2009/0153887 A1 6/2009 Lin et al.

\* cited by examiner

AUTOMATIC POST PROCESSING OF SPOT COLOR COMBINATIONS FOR A CONSTRAINED COLORANT SET

BACKGROUND

Systems and methods herein generally relate to machines having print engines such as printers and/or copier devices and, more particularly, to printer color management in image/text printing.

One of the major challenges for every organization that produces products is that every product needs utmost visual satisfaction and mostly they are not measured by any suitable statistical parameters. Generally, any colorant and its complementary colorant (or opponent) shouldn't have non-zero values together for a particular color sample. However, present spot color recipes for some print servers do not completely eliminate the opponent colorant in order to produce visually trackable smoothness.

The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK), defines a "color space" that includes all colors that can result from any combination of these primaries. The "color space," or "color gamut," may be quite different for different sets of primaries. Typically, a CMYK color gamut falls inside (is smaller than) a RGB color gamut, which means that the eye can detect more colors than a printer can print. In forming multi-color output images on an image-receiving medium, each of the primary colors is transferred to the image-receiving medium in turn. The color gamut is defined by the interaction of the primary colors, and is limited by a total amount of colorant in any combination that can be effectively deposited on the image-receiving medium. In other words, it is not possible to print some colors that can be photographed or displayed on a monitor when using CMYK printing. The color gamut for a particular image forming device and an associated color rendition dictionary (CRD) by which images may be produced by the image forming device is usually stored in metadata with the image forming device. The CRD and associated set of set points programmed into the image forming device, or family of image forming devices, ensures that the color gamut produced by that image forming device covers, as broadly as possible, an available standard color spectrum.

Some printers include an additional housing (sometimes referred to as the fifth color housing, or Xth color housing if more than 5 are enabled) that holds replaceable printing modules (sometimes referred to as a customer replaceable unit (CCU), fifth color module, spot color module, or imaging media cartridge) that are separate from the permanent color printing modules. This allows switching of the replaceable printing modules seamlessly in minutes; however, the fifth colorants (spot colors) are more expensive and used less frequently than the printer's permanent colors.

In multi-colorant applications there are typically colors that are complimentary; that is, they have hue angles that are nearly 180 degrees apart. This is typical since these additional colors are used to extend the 4-color gamut and to produce a color that is outside those reachable using solely CMYK. For example, typical secondary colors, such as a deep red, which is a combination of magenta and yellow, are very hard to reach. The same is often true of green (complementary to magenta) and blue (complementary to yellow). For complementary colors, the presence of both colors tends to produce a neutral hue, so it is not necessary for gamut extension and is violative of the general rule of not making colors that use the complementary colors simultaneously.

Extended gamut colorant destination profiles are designed to use the extended colorant in regions of the color space that cannot be rendered accurately by the main colors alone. The reason why the extended gamut colorant is used in these regions is to facilitate smooth sweeps that progress across the gamut boundary of the main color output to the region(s) requiring the extended gamut colorant for accurate color representation. Since the expensive extended gamut colorant will be used in color regions covered by the main colors, it is desirable not to use the extended gamut colorant if it provides no color gamut advantage versus the main colors alone.

SUMMARY

Exemplary printing devices herein include (among other components) a print engine electrically connected to a processor. The print engine has permanent color printing modules and replaceable printing modules electrically connected to the processor. The permanent color printing modules are permanently mounted within the printer and contain main colors. Each of the permanent color printing modules contains a single one of the main colors. The replaceable printing modules are temporarily mounted within the printer and contain optional colors to extend the available color gamut. The optional colors are more expensive and are used less frequently than the main colors during printing operations. Each of the replaceable printing modules contains a single one of the optional colors.

In operation, the processor receives a print job, and the processor automatically raster image processes print data in the print job to produce a first bitmap for printing the print job with the main colors and at least one of the optional colors. The processor automatically converts the first bitmap into a standardized color space (e.g., RGB, YCbCr, YUV, Lab, CMYK and Luv) to produce an extended gamut of the first bitmap. The processor also automatically identifies a main color gamut of the print engine for printing with only the main colors. In one sense, a color gamut is a set of colors that can be accurately represented in a given circumstance, or by a certain output device. Thus, the main color gamut of the print engine includes all possible colors the print engine can print using only the main colors, and the extended gamut includes all possible colors the print engine can print using the main colors and one of the optional colors.

Devices and methods herein present a solution to the existing spot color recipe where current optimized profiling technology isn't able to maintain a general rule of making colors from different colorants, particularly when the color recipe has complementary colorants. The disclosed method presents a post-processing procedure for the combination of colorants to further edit the color sample using a color replacement strategy. In particular, the method creates spot color recipes for printers with greater than 4 colors or in cases where colorants are restricted from being used in predefined combinations (e.g., not using cyan and red in the same spot color recipe). The method intelligently automates the color correction step to avoid restricted colorant pairs and improve the output of the spot colors with improved smoothness, accuracy, and metameric matching. While the exemplary process is described herein with reference to a print job, spot color recipes may be provided by a user using a spot color editor or other similar device. The methods disclosed herein can be applied to a user defined color recipe so that complementary colors are not used simultaneously in the color recipe.

According to exemplary methods herein, a processor of a printing device determines color values out of a first colorant combination using marking materials for standard colorants and marking materials for one or more extended gamut colors. The extended gamut color has colorants other than the standard colorants. Responsive to the first colorant combination including color values for each of a pair of two complementary colors, the processor calculates a second colorant combination that produces the same human-perceivable color as the first colorant combination. The second colorant combination includes only one color of the pair of two complementary colors. The printing device produces output using the second colorant combination for the standard colorants and the extended gamut color.

According to exemplary methods herein, a processor of a printing device determines color values out of a first colorant combination using marking materials for one or more extended gamut colors. The extended gamut color has colorants other than the standard colorants. Responsive to the first colorant combination including color values for each of a pair of two complementary colors, the processor calculates a revised colorant combination that produces the same human-perceivable color as the first colorant combination. The revised colorant combination includes only one color of the pair of two complementary colors. According to the method for the processor to calculate the revised colorant combination, a first $L*a*b*$ value for the first colorant combination is calculated. The color values for each of the pair of complementary colors are compared and it is determined which of the two complementary colors has a lower color value. The color value for each of the two complementary colors is reduced by the amount of the lower color value. The color value for black is increased by the amount of the lower color value. A second colorant combination is defined including reduced color values for each of the two complementary colors and an increased color value for black. A second $L*a*b*$ value is calculated for the second colorant combination. The difference between the second $L*a*b*$ value and the first $L*a*b*$ value is determined. Responsive to the difference being less than a predetermined threshold, the printing device produces output using the second colorant combination.

A printing device herein includes an input device receiving a print request. The print request specifies marking materials for standard colorants and marking materials for one or more extended gamut colors. The extended gamut color has colorants other than the standard colorants. A processor is operatively connected to the input device. A print engine is operatively connected to the processor. The processor determines color values out of a first colorant combination for the print job. Responsive to the first colorant combination including color values for each of a pair of two complementary colors, the processor calculates a second colorant combination that produces the same human-perceivable color as the first colorant combination. The second colorant combination includes only one color of the pair of two complementary colors. The printing device then prints the print job using the second colorant combination for the standard colorants and the extended gamut color.

According to a computer system for post processing of spot color combinations, the computer system comprises a program product comprising a tangible computer readable storage medium having program code embodied therewith. The program code is readable and executable by a computer to provide an application to perform a method. According to the method, a print job is received into a printing device. The print job specifies marking materials for standard colorants and marking materials for one or more extended gamut colors. The extended gamut color has colorants other than the standard colorants. A processor of the printing device determines color values out of a first colorant combination for the print job. Responsive to the first colorant combination including color values for each of a pair of two complementary colors, the processor calculates a second colorant combination that produces the same human-perceivable color as the first colorant combination. The second colorant combination includes only one color of the pair of two complementary colors. The print job is printed using the second colorant combination for the standard colorants and the extended gamut color.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

Figure 1:
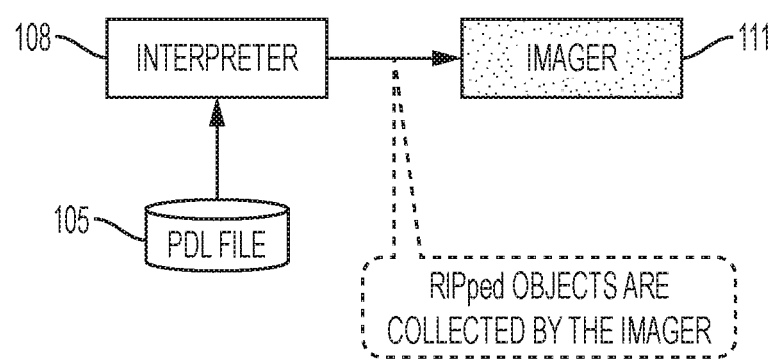
FIG. 1 is a flow diagram illustrating a broad overview of a process according to systems and methods herein.

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

As used herein, an image forming device can include any device for rendering an image on print media, such as a copier, laser printer, bookmaking machine, facsimile machine, or a multifunction machine (which includes one or more functions such as scanning, printing, archiving, emailing, and faxing). "Print media" can be a physical sheet of paper, plastic, or other suitable physical print media substrate for carrying images. A "print job" or "document" is referred to for one or multiple sheets copied from an original print job sheet(s) or an electronic document page image, from a particular user, or otherwise related. An original image is used herein to mean an electronic (e.g., digital) or physical (e.g., paper) recording of information. In its electronic form, the original image may include image data in a form of text, graphics, or bitmaps.

As mentioned above, extended gamut colorants are expensive and, therefore, it is desirable not to use the extended gamut colorant if it provides no color gamut advantage versus the main colors alone. Moreover, as a general rule, complementary colors cannot both be used in a color recipe because the combination would be wasteful. Another reason is that complementary colorants could use the same halftone screens, thus producing visible moiré patterns. Hence, the printing devices and methods disclosed herein provide the capability to automatically determine (on a page-by-page basis) whether the extended colorant will benefit the printed output for a job. The capability comprehends all the input image types (e.g., RGB source, CMYK source, deviceN, spot) within the page description language (PDL) file and the job programming (e.g., spot rendering with the CMYK colorants or the CMYK+extended gamut colorant).

As shown FIG. 1, an incoming job may include a PDL file 105 that describes the appearance of a printed page according to the job. The input may be a page description using a page description language (PDL). A page description language (PDL) is a computer language that describes for the print engine the appearance of a printed page in a higher level than an actual output bitmap. The PDL file 105 specifies the arrangement of the printed page through commands for the print engine. An interpreter 108 may be used in a preprocessing step to interpret a specified number of job pages.

An exemplary processing system may include an interpreter 108 and an imager 111, as shown in FIG. 1. The interpreter 108 and imager 111 are classic components of a two-part raster image processor (RIP), such as may be used to prepare the job for printing. As would be known by one skilled in the art, a raster image processor is a component used in a printing system that produces a raster image, also known as a bitmap. The bitmap is then sent to a printing device for output. Raster image processing is the process that turns the job input information into a high-resolution raster image. The input may be a page description using a page description language (PDL) of higher or lower resolution than the output device. In the latter case, the RIP applies either smoothing or interpolation to the input bitmap to generate the output bitmap.

According to systems and methods herein, the interpreter parses the PDL file 105 according to PDL-specific language constructs, and changes these into pdl-language neutral "objects" that are presented to the imager 111 for collection. In this way, various language-specific interpreters can be mated with a single imager implementation.

All the color spaces in the PDL (RGB, CMYK, spots, separation, deviceN) are rendered by the raster image processor (containing all the raster image processing complexity to the main color and optional color print space. This print space is then evaluated to determine if complementary colors are identified to be used in a color combination for a spot color in the print job.

To print an image, a print engine processor, sometimes referred to herein as an image processor, converts the image in a page description language or vector graphics format to a bit mapped image indicating a value to print at each pixel of the image. A "pixel" refers to the smallest segment into which an image can be divided. Each pixel may represent a dot, also called a picture element. The sequence of dots forming a character is called a raster pattern. The number of dots per inch that a printer generates is called the print resolution, or density. A resolution of 240 pixels means that a printer prints 240 pixels per inch both vertically and horizontally, or 57,200 pixels per square inch (240×240).

Figure 2:
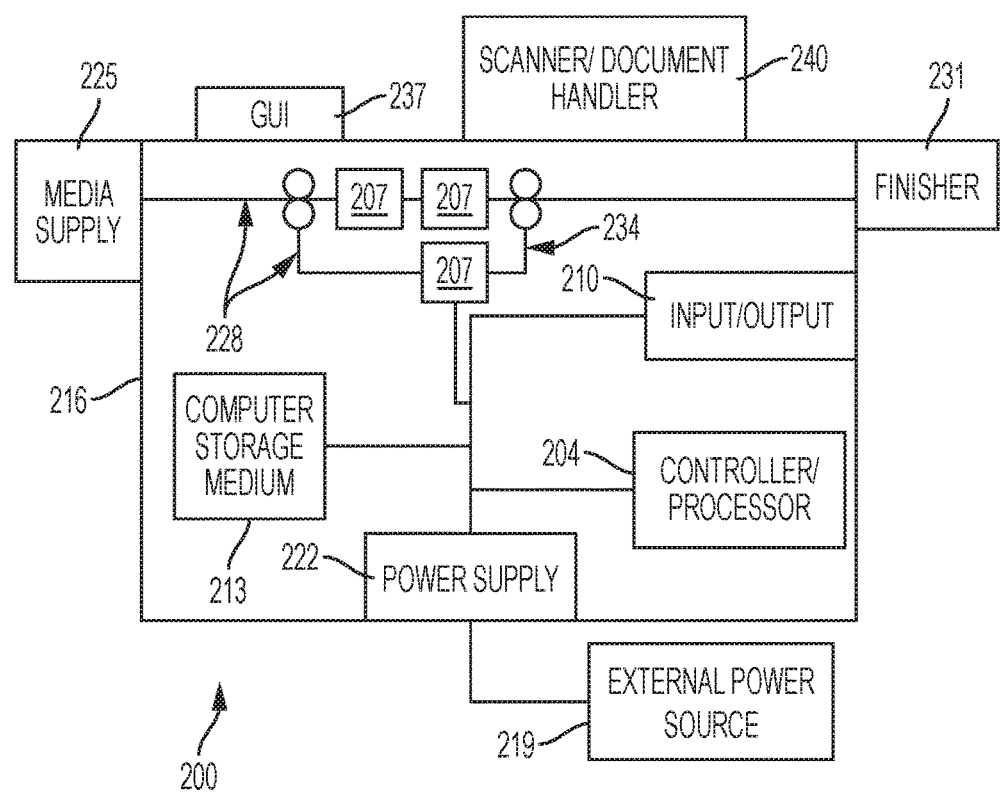
FIG. 2 is a schematic diagram illustrating printing devices herein.

FIG. 2 illustrates many components of an exemplary multi-function device (MFD) 200, which can be used with methods herein. The MFD 200 includes a controller/processor 204 and at least one marking device (print engine(s)) 207 operatively connected to the controller/processor 204. The MFD 200 may also include a communications port (Input/Output device 210) operatively connected to the controller/processor 204 and to a computerized network external to the MFD 200. The Input/Output device 210 may be used for communications to and from the MFD 200.

The controller/processor 204 controls the various actions of the MFD 200, as described below. A non-transitory computer storage medium device 213 (which can be optical, magnetic, capacitor based, etc.) is readable by the controller/processor 204 and stores instructions that the controller/processor 204 executes to allow the MFD 200 to perform its various functions, such as those described herein.

According to systems and methods herein, the controller/processor 204 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the multi-function device 200 is a special purpose machine that includes a specialized image processing card having unique ASICs for providing color image processing, specialized boards having unique ASICs for input and output devices to speed network communications processing, or a specialized ASIC processor that performs the logic of the methods described herein using dedicated unique hardware logic circuits, etc. It is contemplated that the controller/processor 204 may comprise a raster image processor (RIP). A raster image processor uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

Thus, as shown in FIG. 2, a body housing 216 has one or more functional components that operate on power supplied from an external power source 219, which may comprise an alternating current (AC) power source, through the power supply 222. The power supply 222 can comprise a power storage element (e.g., a battery) and connects to the external power source 219. The power supply 222 converts the power from the external power source 219 into the type of power needed by the various components of the MFD 200.

The multi-function device 200 herein has a media supply 225 supplying media to a media path 228. The media path 228 can comprise any combination of belts, rollers, nips, drive wheels, vacuum devices, air devices, etc. The print engine 207 is positioned along the media path 228. That is, the multi-function device 200 comprises a document-processing device having the print engine(s) 207. The print engine(s) 207 prints marks on the media. After receiving various markings from the print engine(s) 207, the sheets of media can optionally pass to a finisher 231 which can fold, staple, sort, etc., the various printed sheets. As described herein, a return paper path 234 may deliver the printed sheets to the same or different print engine 207 for at least a second layer of toner/ink to be applied. Each return of the media to the print engine 207 is referred to herein as a "pass".

The print engine(s) 207 may include a color toner/ink-applying component (i.e., a source of pigmented toner) that supplies at least pigmented colorant for applying colored toner/ink to the media passing through the print engine 207.

In addition, the multi-function device 200 can include at least one accessory functional component, such as a graphic user interface (GUI) assembly 237 or other accessory functional component (such as a scanner/document handler 240, automatic document feeder (ADF), etc.) that operates on the power supplied from the external power source 219 (through the power supply 222).

As would be understood by those ordinarily skilled in the art, the multi-function device 200 shown in FIG. 2 is only one example and the systems and methods herein are equally applicable to other types of devices that may include fewer components or more components. For example, while a limited number of print engines and media paths are illustrated in FIG. 2, those ordinarily skilled in the art would understand that many more paper paths and additional print engines could be included within any device used with embodiments herein.

Figure 3:
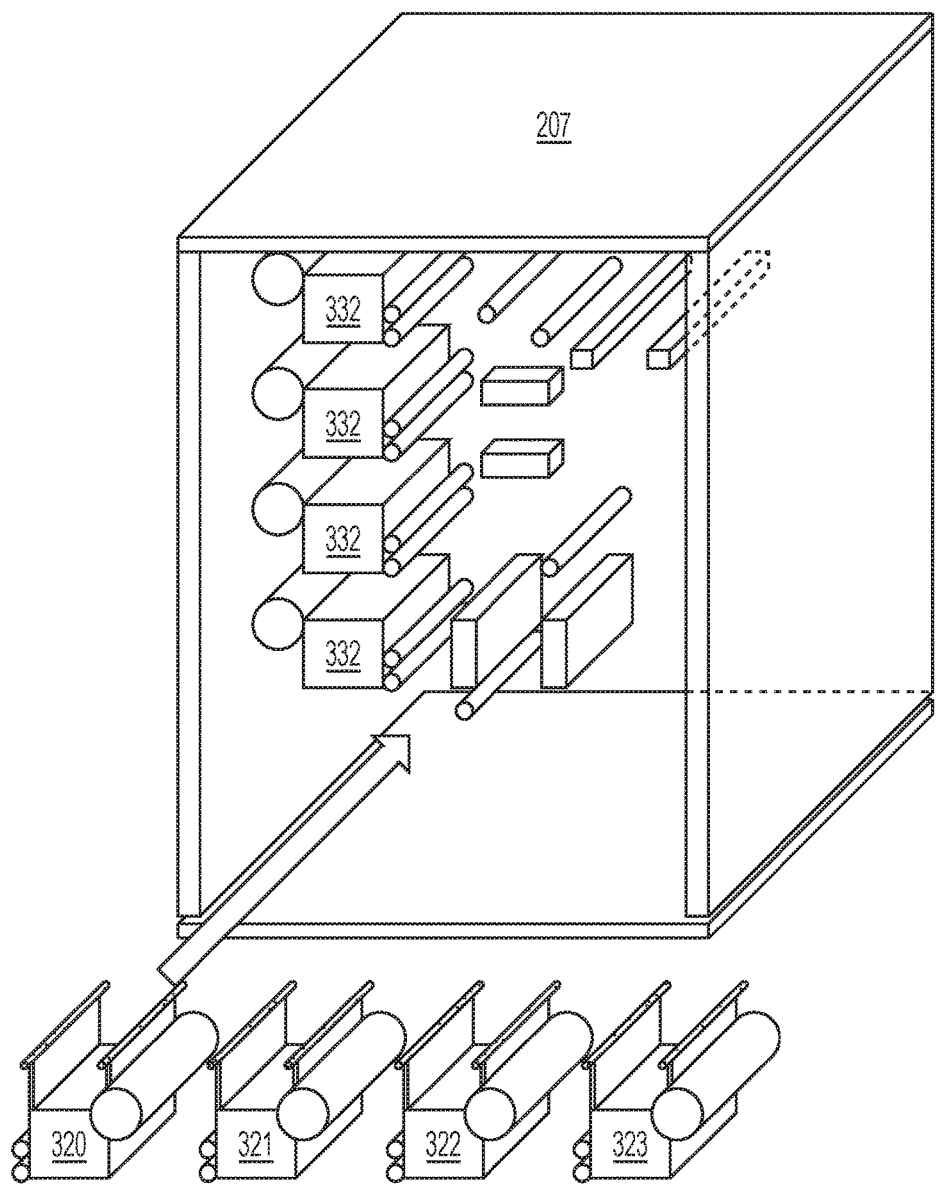
FIGS. 3 and 4 are schematic diagram illustrating the use of replacement printing modules with printing devices herein.

FIG. 3 illustrates a printing device or print engine 207 (which is sometimes referred to as an image output terminal). The print engine 207 includes various main (permanent) printing modules 332 that print using the printer's permanent colors. The main printing modules 332 are used for virtually all print jobs, and are not replaceable by printer users. Typically, the main printing modules 332 are only replaceable as part of a repair operation performed by repair professionals. Thus, replaceable printing modules 320-323 are regularly switched to provide different colors during different printing operations, while the main printing modules 332 are only replaced when they are defective and the printer is being serviced for repair.

Figure 4:
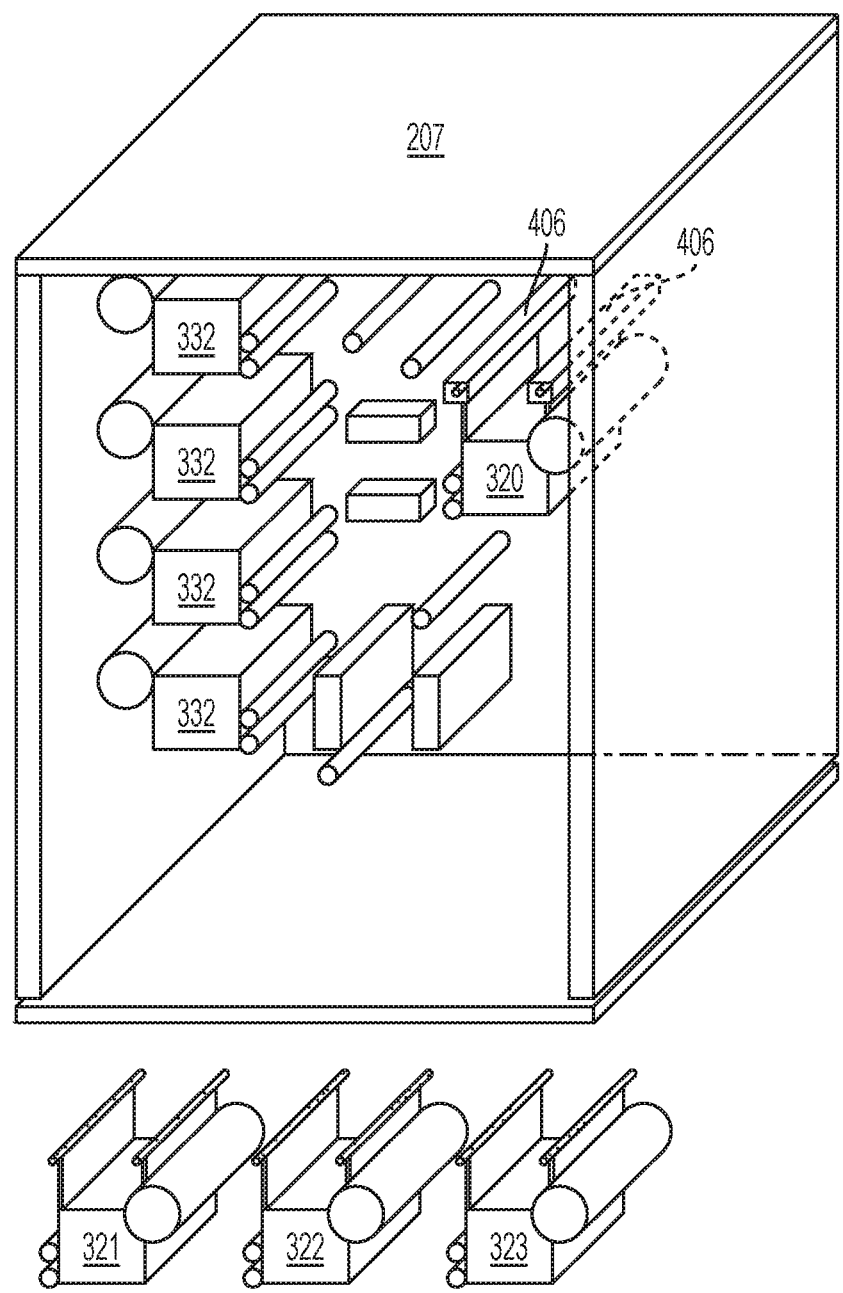

The replaceable printing modules 320-323 are sometimes positioned in a receptacle 406 of the print engine 207, as shown in FIG. 4. Typically, the replaceable printing modules 320-323 print using colors that only appear in a limited number of specialty print jobs. The receptacle 406 can include housing slots that are similarly sized and shaped to match the size and shape of connections of the replaceable printing modules 320-323, allowing the slots to hold the replaceable printing modules. FIG. 4 illustrates one of the replaceable printing modules 320-323 mounted in the receptacle 406 (i.e., replaceable printing module 320 mounted in receptacle 406).

The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK), defines a "color space" that includes all colors that can result from any combination of these primaries. The "color space," or "color gamut," may be quite different for different sets of primaries. Typically, a CMYK color gamut falls inside (is smaller than) a RGB color gamut, which means that the eye can detect more colors than a printer can print. In forming multi-color output images on an image-receiving medium, each of the primary colors is transferred to the image-receiving medium in turn. The color gamut is defined by the interaction of the primary colors, and is limited by a total amount of colorant in any combination that can be effectively deposited on the image-receiving medium. In other words, it is not possible to print some colors that can be photographed or displayed on a monitor when using CMYK printing. The color gamut for a particular image forming device and an associated color rendition dictionary (CRD) by which images may be produced by the image forming device is usually stored in metadata with the image forming device. The CRD and associated set of set points programmed into the image forming device, or family of image forming devices, ensures that the color gamut produced by that image forming device covers, as broadly as possible, an available standard color spectrum. Typically then, image-forming devices are delivered with a single CRD available in the image production system. For example, the main printing modules 332 may contain colorant for each of the four colors in the CMYK color space. The replaceable printing modules 320-323 may contain specialty toner/ink for silver, gold, white, or clear. Alternatively, or in addition, the replaceable printing modules 320-323 may contain colorant for specialty colors, such as red, green, blue, orange, or purple.

In multi-colorant applications there are typically colors that are complimentary; that is, they have hue angles that are nearly 180 degrees apart. This is typical since these additional colors are used to extend the 4-color gamut and to produce a color that is outside those reachable using solely CMYK. For example, typical secondary colors, such as a deep red, which is a combination of magenta and yellow, are very hard to reach. The same is often true of green (complementary to magenta) and blue (complementary to yellow). For complementary colors, the presence of both colors tends to produce a neutral hue, so it is not necessary for gamut extension and is violative of the general rule of not making colors that use the complementary inks simultaneously.

Figure 5:
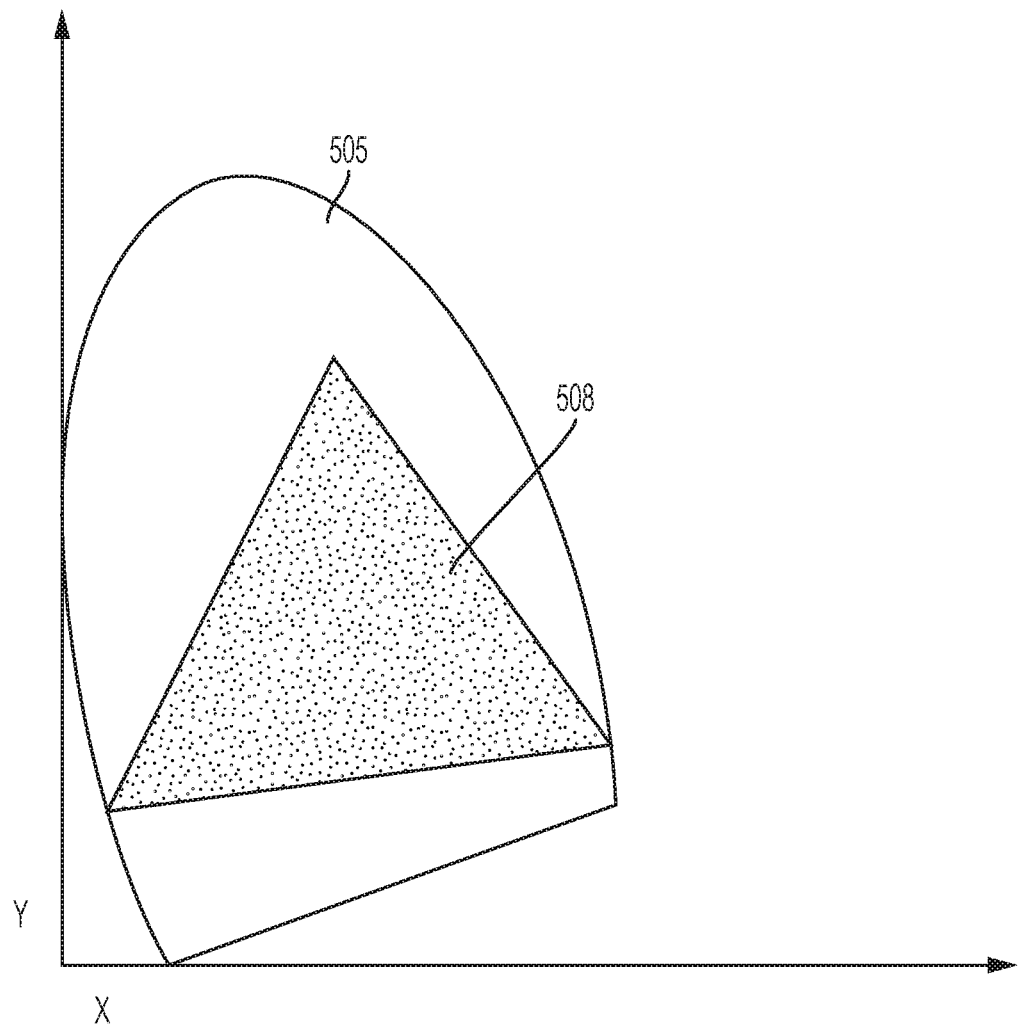
FIG. 5 is a chart showing different color gamuts.

FIG. 5 graphically illustrates how the extended gamut 505 extends the possible colors that can be produced beyond an original color gamut 508 of the printer. The original color gamut 508 is a subset of colors which can be accurately represented in a given circumstance, such as within a given color space or by a certain output device. The original color gamut 508 of the print engine is all possible colors the print engine can print using only the main colors, and the extended gamut 505 is all possible colors the print engine can print using the main colors and one of the optional colors.

Any color space can be used by methods and devices herein including, for example, RGB (red, green, blue), Lab (CIELAB or L*a*b*), YUV (luma (Y') and chrominance (UV)), YCrCb (Y' is the luma component, and CB and CR are the blue-difference and red-difference chroma components), CMYK (cyan, magenta, yellow, black, etc.), etc.

According to a general rule of making colors, certain sets of colorants cannot have non-zero values together in a color recipe for a particular color sample, as they are complementary of each other. That is, complementary colors are colors that are directly opposite each other in the color spectrum. In the CMYK color space, the complementary colors include:

Magenta and Green
Cyan and Red
Yellow and Blue

In the L*a*b*color space, the complementary colors (usually referred to as opponent colors) include:

Black and White
Red and Green
Yellow and Blue

Note: for human perception, cyan is the color between blue and green, orange is the color between red and yellow, and purple is the color between red and blue. One of the reasons to not use complementary colorants in the same color recipe is that they could use the same halftone screens, thus producing visible moiré patterns.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

As mentioned above, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, an RGB-to-YCbCr converter to obtain luminance (Y) and chrominance (Cb, Cr) values. It should be appreciated that pixels may be represented by values other than RGB or YCbCr.

Figure 6A:
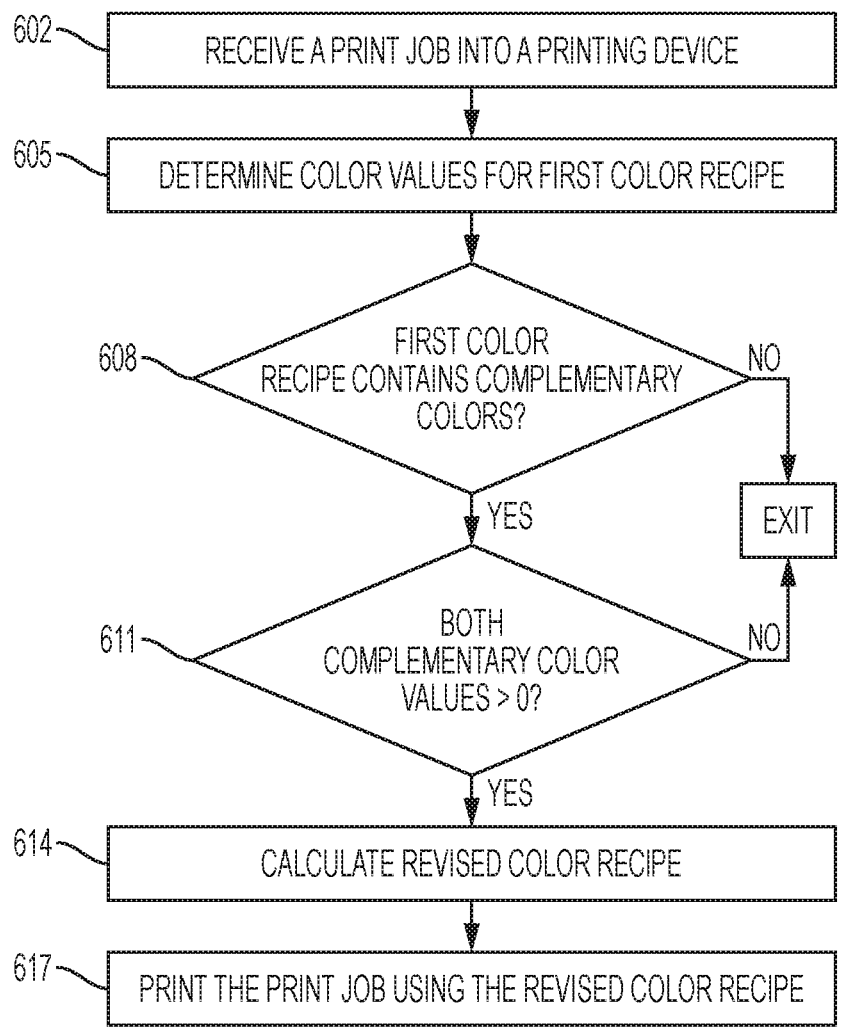
FIGS. 6A and 6B are flow charts illustrating methods herein.

FIG. 6A is a flow diagram illustrating the processing flow of an exemplary method according to the present disclosure. At 602, a print job is received into a printing device having permanent color printing modules and replaceable printing modules. As shown in FIGS. 3 and 4, the permanent color printing modules 332 are permanently mounted within the print engine 207 and contain main colors, and each of the permanent color printing modules 332 contains a single one of the main colors. The replaceable printing modules 320-323 are temporarily mounted within the printer and contain optional colors, and each the replaceable printing modules 320-323 contains a single one of the optional colors. Further, the optional colors are more expensive and are used less frequently than the main colors during printing operations. The color values out of a first colorant combination for the print job are determined by a processor of the printing device, in item 605. The color combination is sometimes referred to herein as the color recipe. The following example discusses C, M, Y, K, X; however, other color schemes may be used. In item 608 the color recipe is evaluated to determine if it contains any complementary colors. If not, then exit and follow the existing workflow. In this example, assume that the values of C, M, Y, K, and X are Cc, Cm, Cy, Ck, and Cx. Each of the color values is a number from zero to 255 (i.e., 0<=Cc, Cm, Cy, Ck, Cx<=255). For this example, assume Y and X are complementary colors (e.g., yellow and blue, magenta and green, or cyan and red). In item 611, the color values for the complementary colors are evaluated to determine if they are both greater than zero. If they are not both greater than zero, then exit and follow the existing workflow. If the first color recipe includes color values for the two complementary colors that are not both zero, in item 614, the processor calculates a revised color recipe that produces the same human-perceivable color as the first color recipe. The revised color recipe includes only one of the two complementary colors. In item 617, the print job is printed using the revised color recipe. Note: in some cases, the color recipe may be provided by a user using a spot color editor or other similar device. The method disclosed herein can be applied to a user defined color recipe so that complementary colors are not used simultaneously in the color recipe.

Figure 6B:
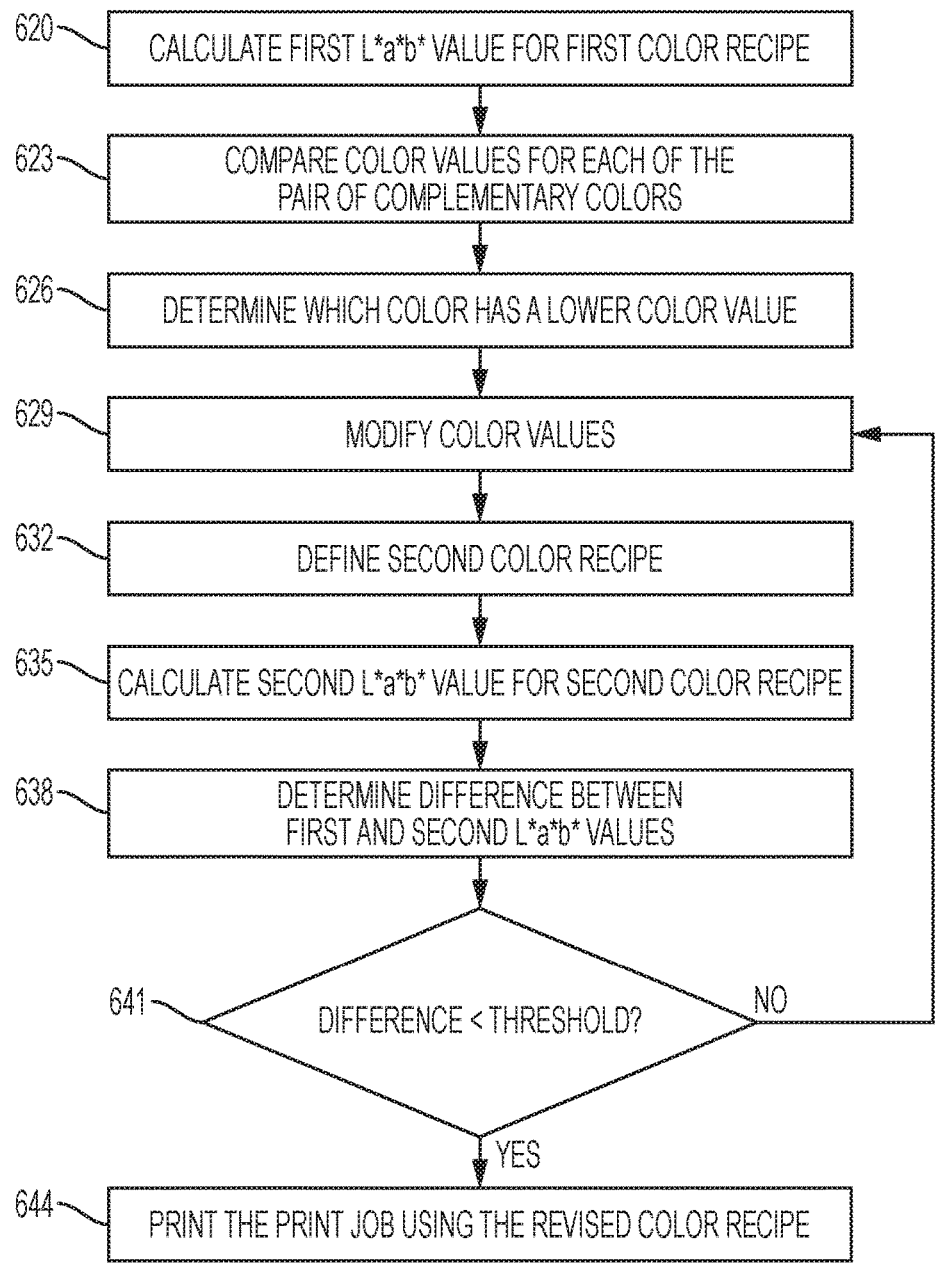

FIG. 6B is a flow diagram illustrating the processing flow of an exemplary method to calculate a revised color combination when the color recipe includes complementary colors. The goal is to find another color recipe that produces the same human-perceivable color as the first color recipe, but entirely eliminates the smaller value between the two complementary colors. In item 620, a first L*a*b* value for the first color recipe is calculated. The L*a*b* color space includes all perceivable colors, which means that its gamut exceeds those of the RGB and CMYK color models. As would be know by one of ordinary skill in the art, L is for lightness and a and b are for the color-opponent dimensions based on transformation of the color data. In item 623, the color values for each of the pair of complementary colors are compared. In item 626, determine which color of the two complementary colors has a lower color value. In item 629, the color values for the complementary colors and black are modified. In a first iteration, the color value for each of the two complementary colors is reduced by the amount of the lower color value and the color value for black is increased by the amount of the lower color value. In item 632, a second color recipe is defined including the modified color values for each of the two complementary colors and black. In item 635, a second L*a*b* value is calculated for the second color recipe. The difference between the second L*a*b* value and the first L*a*b* value is determined, in item 638. In item 641, if the difference between the first L*a*b* value and the second L*a*b* value is less than a predetermined threshold, the print job is printed using the second color recipe, in item 644. Otherwise, the process returns to item 629, the values for black and the primary color are modified by a pre-defined amount (pre-defined Delta), and the second L*a*b* value is iteratively recalculated. In some cases, the difference between the first L*a*b* value and the second L*a*b* value is calculated using the absolute value of the L*a*b* scores.

The following is exemplary code that can be used to evaluate the complementary colors and produce a revised color recipe.

```
Calculate LAB value of CMYKX and save as LAB1
Set ChangeCx = false, ChangeCy = false;
    IF Cy <= Cx
        Set Cx = Cx - Cy;
        Set Ck = Ck + Cy;
        Set Cy = 0;
        Set ChangeCx = true;
    Else
        Set Cy = Cy - Cx;
        Set Ck = Ck + Cx;
        Set Cx = 0;
        Set ChangeCy = true;
    EndIF
Calculate LAB of modified CMYKX and save as LAB2
CkTemp = Ck; CxTemp = Cx;
Calculate dE between LAB1 and LAB2;
    dEbkp = dE;
    IF (ChangeCx)
        Modify Ck and Cx with pre-defined Delta
        Calculate LAB of modified CMYKX, save as LAB2
        Calculate dEtmp between LAB1 and LAB2;
        IF (dE < dEtmp)
            Ck = CkTemp; Cx = CxTemp;
        Else
            dE = dEtmp;
        EndIF
    ElseIF (ChangeCy)
        Modify Ck and Cy with pre-defined Delta
        Calculate LAB of modified CMYKX, save as LAB2
        Calculate dEtmp between LAB1 and LAB2;
        IF (dE < dEtmp)
            Ck = CkTemp; Cx = CxTemp;
        Else
            dE = dEtmp;
        EndIF
    EndIF
IF (dE > 1, or some tolerance)
    CcTemp = Cc; CmTemp = Cm;
    Modify Ck and Cx with pre-defined Delta
    Calculate LAB of modified CMYKX, save as LAB2
    Calculate dEtmp between LAB1 and LAB2;
    IF (dE < dEtmp)
        Ck = CkTemp; Cx = CxTemp;
    Else
        dE = dEtmp;
    EndIF
EndIF
```

It is contemplated that the known complementary colors, and their substitutes, may be pre-calculated and saved in a database or table so that they can be looked-up instead of having to calculate the second recipe each time, such tables could be stored locally in the printer/server, or remotely. According to devices and methods herein, the process calculates the second recipe each time. This presents an intelligent post processing method for spot color recipes that will make one of the opponent colorants zero while achieving the same smoothness by doing a color replacement strategy. It is further contemplated that the color recipe may be provided by a user using a spot color editor or other similar device. The method disclosed herein can be applied to a user defined color recipe so that complementary colors are not used simultaneously in the color recipe.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device. An image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

Figure 7:
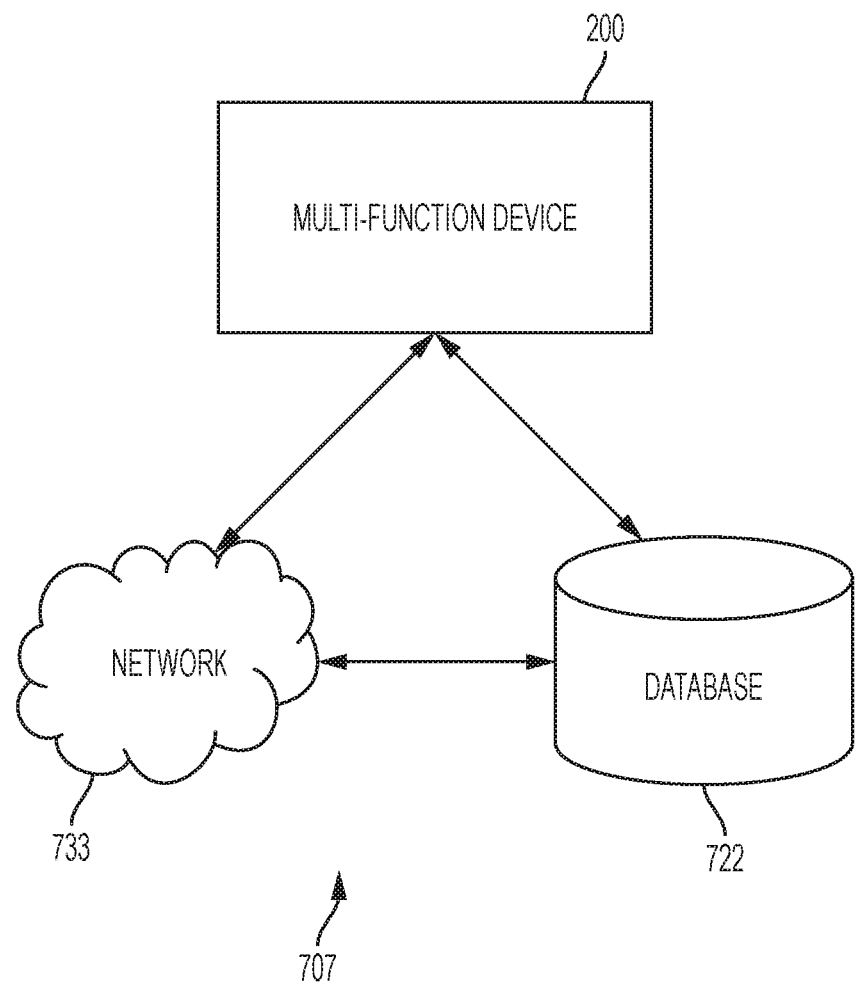
FIG. 7 is a block diagram of a network according to systems and methods herein.

FIG. 7 is a general overview block diagram of a network, indicated generally as 707, for communication between the multi-function device 200 and a database 722. The multi-function device 200 may comprise any form of processor as described in detail above. The multi-function device 200 can be programmed with appropriate application software to implement the methods described herein. Alternatively, the multi-function device 200 is a special purpose machine that is specialized for processing image data and includes a dedicated processor that would not operate like a general purpose processor because the dedicated processor has application specific integrated circuits (ASICs) that are specialized for the handling of image processing operations, processing pixel data, etc. In one example, the multi-function device 200 is a special purpose machine that includes a specialized card having unique ASICs for providing image processing instructions, specialized boards having unique ASICs for input and output devices to speed network communications processing, or a specialized ASIC processor that performs the logic of the methods described herein (such as the processing shown in FIGS. 6A and 6B) using dedicated unique hardware logic circuits, etc.

Database 722 includes any database or any set of records or data that the multi-function device 200 desires to retrieve. Database 722 may be any organized collection of data operating with any type of database management system. The database 722 may contain matrices of datasets comprising multi-relational data elements.

The database 722 may communicate with the multi-function device 200 directly. Alternatively, the database 722 may communicate with the multi-function device 200 over network 733. The network 733 comprises a communication network either internal or external, for affecting communication between the multi-function device 200 and the database 722.

Figure 8:
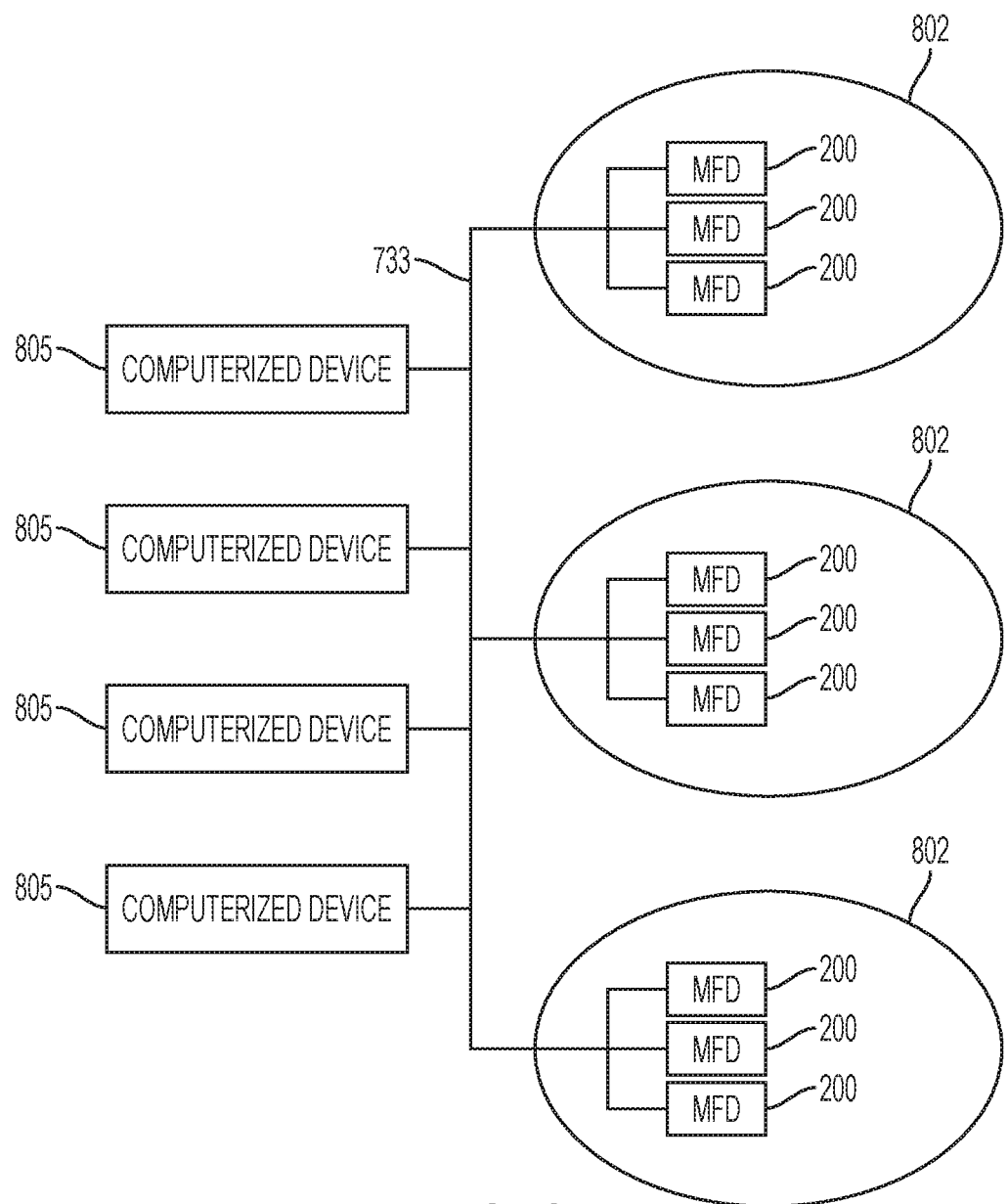
FIG. 8 is a schematic diagram illustrating systems and methods herein.

As shown in FIG. 8, exemplary printers, copiers, multi-function machines, and multi-function devices (MFD) 200 may be located at various different physical locations 802. Other devices according to systems and methods herein may include various computerized devices 805. The computerized devices 805 can include print servers, printing devices, personal computers, etc., and are in communication (operatively connected to one another) by way of the network 733. The network 733 may be any type of network, including a local area network (LAN), a wide area network (WAN), or a global computer network, such as the Internet.

To render an image is to reduce the image data (or a signal thereof) to viewable form; store the image data to memory or a storage device for subsequent retrieval; or communicate the image data to another device. Such communication may take the form of transmitting a digital signal of the image data over a network.

According to a further system and method herein, an article of manufacture is provided that includes a tangible computer readable medium having computer readable instructions embodied therein for performing the steps of the computer implemented methods, including, but not limited to, the method illustrated in FIGS. 6A and 6B. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIGS. 6A and 6B.

The computer program instructions may be stored in a computer readable medium that can direct a computer, other programmable data processing apparatus, or other devices to process in a particular manner, such that the instructions stored in the computer readable medium produce an article of manufacture including instructions which implement the process/act specified in the flowchart and/or block diagram block or blocks.

The hardware described herein plays a significant part in permitting the foregoing method to be performed, rather than function solely as a mechanism for permitting a solution to be achieved more quickly, (i.e., through the utilization of a computer for performing calculations). Specifically, printers, scanners, and image processors that alter electronic documents each play a significant part in the methods (and the methods cannot be performed without these hardware elements). Therefore, these hardware components are fundamental to the methods being performed and are not merely for the purpose of allowing the same result to be achieved more quickly.

As would be understood by one ordinarily skilled in the art, the processes described herein cannot be performed by human alone (or one operating with a pen and a pad of paper) and instead such processes can only be performed by a machine. Specifically, processes such as printing, scanning, electronically altering color schemes using an image processor, etc., require the utilization of different specialized machines. Therefore, for example, the printing/scanning performed by the user device cannot be performed manually (because it can only be done by printing and scanning machines) and is integral with the processes performed by methods herein. In other words, these various machines are integral with the methods herein because the methods cannot be performed without the machines (and cannot be performed by humans alone).

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a 'circuit', 'module, or 'system.' Furthermore, aspects of the present disclosure may take the form of a computer program product embodied in one or more computer readable medium(s) having computer readable program code embodied thereon.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, the claims presented below are not intended to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, print engines, etc., are well known, and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terminology used herein is for the purpose of describing particular examples of the disclosed structures and methods and is not intended to be limiting of this disclosure. For example, as used herein, the singular forms 'a', 'an', and 'the' are intended to include the plural forms as well, unless the context clearly indicates otherwise. Additionally, as used herein, the terms 'comprises', 'comprising', 'includes', and/or 'including', when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

The corresponding structures, materials, acts, and equivalents of all means or step plus process elements in the claims below are intended to include any structure, material, or act for performing the process in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method comprising:
determining, by a processor of a printing device, pixel color values for each color of a first colorant combination using marking materials for standard colorants and marking materials for one or more extended gamut colors, said extended gamut color having colorants other than said standard colorants;
responsive to said first colorant combination including a first pixel color value for a first color of a pair of two complementary colors and a second pixel color value for a second color of said pair of two complementary colors, said first pixel color value and said second pixel color value being greater than zero, said processor calculating a second colorant combination that produces the same human-perceivable color as said first colorant combination, by
calculating a first L*a*b* value for said first colorant combination,
comparing said first pixel color value for said first color of said pair of two complementary colors and said second pixel color value for said second color of said pair of two complementary colors and determining which color of said pair of two complementary colors has a lower number for the pixel color value,
reducing the pixel color value for each color of said pair of two complementary colors by the amount of said lower number, such that only one color of said pair of two complementary colors has a non-zero pixel color value,
increasing the pixel color value for black by the amount of said lower number, and
defining a second colorant combination comprising reduced pixel color values for each color of said pair of two complementary colors and an increased pixel color value for black, wherein said second colorant combination includes only one color of said pair of two complementary colors; and
producing output from said printing device using said second colorant combination for said standard colorants and said extended gamut color.

2. The method according to claim 1, said standard colorants comprising cyan, yellow, magenta, red, green, blue, and black.

3. The method according to claim 1, said complementary colors comprising colors having a hue angle approximately 180° apart.

4. The method according to claim 3, said pair of two complementary colors comprising one of:
cyan and red,
magenta and green, and
yellow and blue.

5. The method according to claim 1, further comprising:
calculating a second L*a*b* value for said second colorant combination;
determining the difference between said second L*a*b* value and said first L*a*b* value; and
responsive to said difference being less than a predetermined threshold, producing output from said printing device using said second colorant combination.

6. The method according to claim 5, further comprising:
responsive to said difference being greater than said predetermined threshold, adjusting the pixel color value for the only one color of said pair of two complementary colors by a pre-defined amount;
adjusting the pixel color value for black by said pre-defined amount; and
calculating a modified L*a*b* value using adjusted pixel color values for black and said only one color of said pair of two complementary colors.

7. The method according to claim 6, further comprising:
iteratively adjusting pixel color values for black and said only one color of said pair of two complementary colors; and
determining the difference between modified L*a*b* values and said first L*a*b* value until said difference is less than said predetermined threshold.

8. A method, comprising:
determining, by a processor of a printing device, pixel color values for each color of a first colorant combination using marking materials for standard colorants and marking materials for one or more extended gamut colors, said extended gamut color having colorants other than said standard colorants;
responsive to said first colorant combination including a first pixel color value for a first color of a pair of two complementary colors and a second pixel color value for a second color of said pair of two complementary colors, said first pixel color value and said second pixel color value being greater than zero, said processor calculating a second colorant combination that produces the same human-perceivable color as said first colorant combination, said second colorant combination including only one color of said pair of two complementary colors, said processor calculating said second colorant combination, comprising:
calculating a first L*a*b* value for said first colorant combination,
comparing said first pixel color value for said first color of said pair of two complementary colors and said second pixel color value for said second color of said pair of two complementary colors and determining which of said two complementary colors has a lower number for the pixel color value,
reducing the pixel color value for each color of said pair of two complementary colors by the amount of said lower number, such that only one color of said pair of two complementary colors has a non-zero pixel color value,
increasing the pixel color value for black by the amount of said lower number,
defining a second colorant combination comprising reduced pixel color values for each color of said pair of two complementary colors and an increased pixel color value for black,
calculating a second L*a*b* value for said second colorant combination, and
determining the difference between said second L*a*b* value and said first L*a*b* value; and
responsive to said difference being less than a predetermined threshold, printing from said printing device using said second colorant combination.

9. The method according to claim 8, further comprising:
responsive to said difference being greater than said predetermined threshold, adjusting the pixel color value for the only one color of said pair of two complementary colors by a pre-defined amount;
adjusting the pixel color value for black by said pre-defined amount; and
calculating a modified L*a*b* value using adjusted pixel color values for black and said only one color of said pair of two complementary colors.

10. The method according to claim 9, further comprising:
iteratively adjusting pixel color values for black and said only one color of said pair of two complementary colors; and
determining the difference between modified L*a*b* values and said first L*a*b* value until said difference is less than said predetermined threshold.

11. The method according to claim 8, said color gamut comprising cyan, yellow, magenta, red, green, blue, and black.

12. The method according to claim 8, said complementary colors comprising colors having a hue angle approximately 180° apart.

13. The method according to claim 12, said pair of two complementary colors comprising one of:
cyan and red,
magenta and green, and
yellow and blue.

14. A printing device, comprising:
an input device receiving a print request specifying marking materials for standard colorants and marking materials for one or more extended gamut colors, said extended gamut color having colorants other than said standard colorants;
a processor operatively connected to said input device; and
a print engine operatively connected to said processor,
said processor determining pixel color values of a first colorant combination for said print request,
responsive to said first colorant combination including a first pixel color value for a first color of a pair of two complementary colors and a second pixel color value for a second color of said pair of two complementary colors, said first pixel color value and said second pixel color value being greater than zero, said processor calculating a second colorant combination that produces the same human-perceivable color as said first colorant combination by
calculating a first L*a*b* value for said first colorant combination,
comparing said first pixel color value for said first color of said pair of two complementary colors and said second pixel color value for said second color of said pair of two complementary colors and determining which color of said pair of two complementary colors has a lower number for the pixel color value,
reducing the pixel color value for each color of said pair of two complementary colors by the amount of said lower number, such that only one color of said pair of two complementary colors has a non-zero pixel color value,
increasing the pixel color value for black by the amount of said lower number, and
defining a second colorant combination comprising reduced pixel color values for each color of said pair of two complementary colors and an increased pixel color value for black, wherein said second colorant combination includes only one color of said pair of two complementary colors, and
said printing device printing said print request using said second colorant combination for said standard colorants and said extended gamut color.

15. The printing device according to claim 14, said pair of two complementary colors comprising one of:
cyan and red,
magenta and green, and
yellow and blue.

16. The printing device according to claim 14, further comprising:
said processor calculating a second L*a*b* value for said second colorant combination;
said processor determining the difference between said second L*a*b* value and said first L*a*b* value; and
responsive to said difference being less than a predetermined threshold, said printing device printing said print request using said second colorant combination.

17. The printing device according to claim 16, further comprising:
responsive to said difference being greater than said predetermined threshold,
said processor adjusting the pixel color value for the only one color of said pair of two complementary colors by a pre-defined amount;
said processor adjusting the pixel color value for black by said pre-defined amount; and
said processor calculating a modified L*a*b* value using adjusted pixel color values for black and said only one color of said pair of two complementary colors.

18. The printing device according to claim 17, further comprising:
said processor iteratively adjusting pixel color values for black and said only one color of said pair of two complementary colors; and
said processor determining the difference between modified L*a*b* values and said first L*a*b* value until said difference is less than said predetermined threshold.

* * * * *